P. TOURTIER.
STAND FOR BICYCLES AND OTHER VEHICLES.
APPLICATION FILED OCT. 22, 1915.
1,211,898.
Patented Jan. 9, 1917.
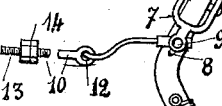
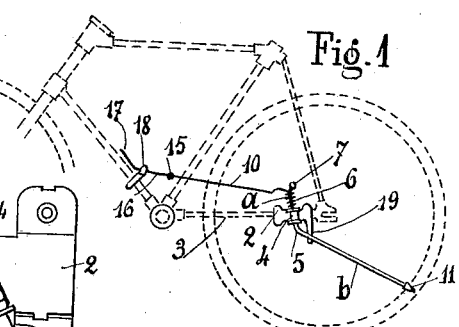
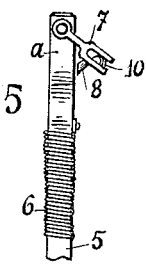
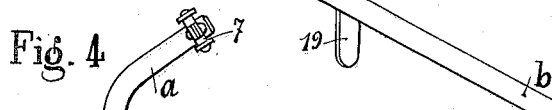
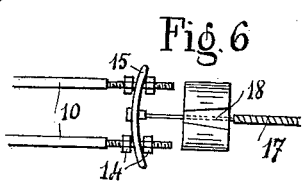
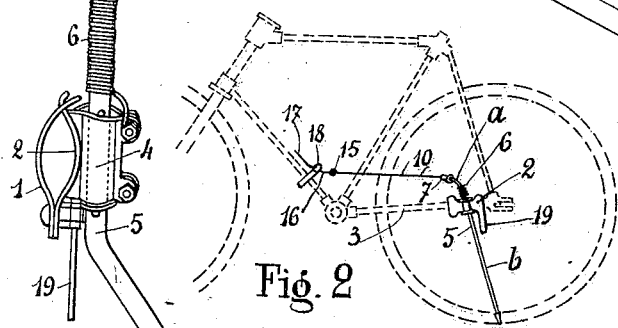
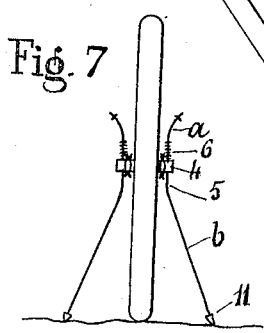
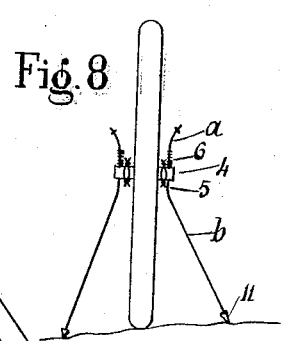
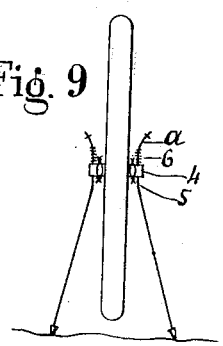
WITNESSES.
Samuel Percival
Sydney Nash
INVENTOR
Paul Tourtier
By his Attorneys
Wheatley MacKenzie

UNITED STATES PATENT OFFICE.

PAUL TOURTIER, OF PARIS, FRANCE.

STAND FOR BICYCLES AND OTHER VEHICLES.

1,211,898. Specification of Letters Patent. Patented Jan. 9, 1917.

Application filed October 22, 1915. Serial No. 57,327.

*To all whom it may concern:*

Be it known that I, PAUL TOURTIER, a citizen of the French Republic, residing at 47 Rue Desrenaudes, Paris, France, have invented certain new and useful Improvements in Stands for Bicycles and other Vehicles, of which the following is a specification.

The present invention relates to stands for bicycles, motor cycles and other similar vehicles, having wheels arranged in the same plane one behind the other and is an improvement in stands of the kind wherein bent rods carried on the frame of the bicycle on each side of one of the wheels are each arranged to pivot around the axis of one of its arms in such a manner that it is possible by imparting a rotary movement to the rods, to move the lower ends of the arms that form the support into contact with the ground or road or on the contrary to move them away from the ground into the position occupied when not in use, the operating of the two support rods being effected by means of flexible rods, cables, chains or other similar devices, operated by levers or handles. Hitherto, this kind of stand or support has not given good practical results, since the principle on which it works and its construction based on this principle do not enable it to furnish a stable equilibrium except on ground which is absolutely horizontal and level, conditions which are difficult to find at the same time, the roads being generally convex and having depressions and protuberances.

The present invention introduces improvements in stands of this kind, with the object of producing a practical and serviceable apparatus which acts as a stand on any kind of ground, whether level or flattened down, horizontal or slightly inclined.

A further object of these improvements is to increase the practical scope of this apparatus, which can be employed as a brake and as an anti-skidding device, for facilitating the cleaning and the lubrication of the back wheel, of the chain and of the pedal shaft and as an apparatus for enabling the vehicle to be stored in the house.

The improvements which constitute the invention relate to a modification in the carrying out of the principle that regulates this existing kind of stand as well as in the construction of the devices by which it is constituted and based on the modification in the carrying out of this principle, a construction which moreover enables this apparatus to be applied to any kind of bicycle for men or women, and to be mounted by any person without special knowledge.

In existing stands as constructed and acting, the functional principle on which they are based was such that the extreme depth that could be reached by the ends of the support rods was a point that appeared in the horizontal plane of contact of the wheel and the ground, the rotary movement of the rods terminating precisely at that moment and in that plane. On the contrary in the improved stand according to the invention, the functional principle on which it is based is such that the extreme lowest point that can be reached by the ends of the support rods is not reached when these ends reach the horizontal plane of contact of the wheel and the ground, any more than is the limit of rotation of the rods. From this principle thus improved it will be seen that the ends of the rods being still capable of reaching points below the horizontal plane of contact of the wheel-tire and the ground the bicycle can be supported firmly on uneven ground, the construction of the apparatus insuring with this object the relative independence of the rotation of the rods as regards one another, whereby the position of the ends of the rods is assured either at different levels below or above the horizontal level of the point of contact of the wheel-tire and the ground or at different levels below and above (shelving road or uneven ground).

The improved stand according to the present invention, is illustrated in the drawings annexed to the present specification, according to which, Figure 1 is a side view of a bicycle on which the stand is mounted, which is shown in the position when not in use, that is to say with the rods raised. Fig. 2 is a similar view, showing the stand in the position when in use, that is to say, with the rods lowered. In these figures only one of the two rods which constitute the support is visible the other being arranged similarly and symmetrically on the other side of the wheel. Fig. 3 is a detail view of one of the two rods constituting the support and the position of which corresponds with that shown in Fig. 1. Fig. 4 is a detail view of the same rod, its position being the same as that in Fig.

2, but seen as looking at the bicycle from the front. Fig. 5 is a detail view of the upper end of the rod seen from the side in relation to Fig. 3, showing the position of the traction fork when the said rod is in position out of use. Fig. 6 is a plan of the yoke controlling the traction device of the rods. Fig. 7 is a diagrammatic view seen from the back of the bicycle showing the rods of the apparatus in position as in use in its capacity of stand or support, the ground being shown as horizontal and even. Fig. 8 is a similar view, the ground being shown as inclined and uneven. Fig. 9 is a similar view, the position of the rods being such that the back wheel is raised from the ground, so as to enable it to be cleaned, or to be taken into the house.

In these drawings, 1 and 2 are the two parts of the fixing sleeve or clamp which is detachably secured by means of bolts and nuts on each tube 3 of the lower back fork of a bicycle. The part 2 of the sleeve has another sleeve 4 which is cast in one piece with it or otherwise formed. The sleeve 4 which is tightened by means of bolts and nuts is arranged with its axis oblique relatively to that of the sleeve 1 2 and receives the pivoting rod 5 of the stand. The rod 5 is mounted in the sleeve as in a bearing and consists of a single piece, bent in one plane to form a short arm a and a long arm b.

The length of the straight portion of the pivoting rod 5 that passes through the bearing 4 is such that the rod can receive a torsion spring 6 the one end of which is fixed to the rod 5 and the other to the sleeve 4.

The arm a or arm that controls the rotation of the rod 5 has at its end a fork 7 which is pivoted to turn in a plane perpendicular to the plane that runs through the rod 5 and its arms a and b. A stop 8 fixed behind the fork 7 limits the oscillation thereof in relation to the arm a (as shown in Fig. 5), this limitation being essential so as to allow the traction devices which insure the rotation of the rod 5 to be operated smoothly and without stress. Further the fork being thus restricted in its movement toward the arm a, provides a lever arm sufficient for enabling the rotation of the rod 5 to be effected notwithstanding the position of the said arm a in a plane parallel or nearly parallel to the plane of traction, whereby the maximum rotation of the rod 5 is insured with the minimum displacement of the traction devices.

The stop 8 can be arranged on the fork 7 in any suitable manner. It can be fixed to the inner arm of the fork (Fig. 5) or formed by the extension of the shaft 9 on which the traction device is mounted which consists of a rod 10 jointed or not or of a cable, a chain or other similar device. The arm b or support arm terminates in a screw ferrule 11 made of tempered steel and may be of a kind that can be easily replaced when it is worn in consequence of its frequent contact with the ground.

The traction device 10 pivoted at 9 to the fork 7 is formed preferably of a rod 10, jointed as shown at 12, the forward end of which rod is attached with a certain amount of play and so that its length can be regulated by a screw thread 13 and suitable nuts 14 to a yoke 15 to which is also attached the end of the traction rod 10 of the second rod 5 situated symmetrically on the other side of the wheel. To the middle of the yoke 15 is fixed the end of the traction controlling device which is formed preferably by a flexible cable 16 with a sheath 17, a stop lug and guide 18 being provided on the frame through which the cable passes to an operating handle or other device placed within reach of the hand.

It is essential that the portion of the traction device 16 situated between the said yoke 15 and the guide lug 18 should not be rigid or be rigidly mounted also that the ends 13 of the rods 10 should be mounted with a certain play in the yoke 15 in order that the traction device including the rods 10 and the pivoted forks 7 may form a yielding tractive arrangement capable of moving aside from the ends of the arms a of the rods 5 up to the lug 18, this moving aside of the tractive arrangement being essential in order that notwithstanding the unique and simultaneous control of the rotation of the rods 5, a certain independence in the said rotation of the rods in relation to one another may be possible, this independence being necessary for enabling the ends 11 of the arms b to stop at points situated at different levels above or below or above and below the horizontal level of the point of contact of the wheel tire with the ground, as shown for example in Fig. 8.

In order to prevent the arms b from touching the wheel, stops 19 are provided, cast with or fixed on the parts 2 of the fixing sleeves of the apparatus, these said stops being easily twisted by hand so as to regulate, as desired, the spacing of the arms b in relation to the wheel rim or felly.

The working of this improved stand is as follows: When the apparatus is in position not in use (Figs. 1 and 3) all that is necessary for putting the arms b into position for use by operating the handle that controls the flexible device 16, is to bring the yoke 15 by traction toward the guide lug 18 in the front of the machine, in order, through the medium of the rods 10 and the forks 7 to cause the rotation of the rods 5 which notwithstanding the opposition of the torsion springs 6, assume the position shown in Figs. 2 and 7, the ends 11 of the arms $b$ being at a certain distance from each side of the wheel (Fig. 7) in contact with the ground at points situated in one and the same horizontal plane as the point of contact of the wheel tire with the ground (Fig. 2) and either opposite said point or even behind it. In this position of the arms $b$ of the rods 5 the apparatus can be employed as a stand, the cyclist remaining in the saddle or not.

In order to return the apparatus into the position out of use, it is only necessary to release the handle. Under the action of the torsion springs 6, the rods 5 are brought into planes parallel or nearly so to the plane of the wheel in the position shown in Figs. 1 and 3, the ends 11 of the arms $b$ coming into proximity with the rim of the wheel without however touching it, in consequence of the stops 19 limiting the movement of the said arms $b$.

When the rods are in the position for use as a stand, the limit of rotation of the said rods is not yet reached, since the plane passing through the bent arms $a$ and $b$ of the rods 5 is nearly perpendicular to the plane of the wheel and that the yoke 15 that controls the rotation is not at the end of its movement against the guide lug 18. A certain angle of rotation thus still remains serviceable, depending on the extent of movement of the yoke 15 toward the ring 18 for bringing the ends 11 of the arms $b$ to points situated below the horizontal plane of contact of the wheel with the ground, and in front of or immediately opposite the point of contact of the wheel tire with the ground. In this movement, in consequence of the traction exerted, and the oblique position of the axis of rotation of the rods 5 in their bearing 4 being duly understood, the ends 11 have a tendency to descend below the tangential plane, whereby the back wheel may be supported. The rotation of the rods 5 is limited by the stopping of the yoke 15 against the guide lug 18, as well as by the position of the rods 5, the plane of which after a half-turn, has become parallel or nearly so to the plane of the wheel, and in this position the apparatus allows the cleaning of the wheel and of the pedal shaft to be effected as well as the bicycle to be taken into the house.

From the preceding it will be seen that when the apparatus is to be employed as a support or stand on a depression in the ground or on a convex road, the rotation of the rods 5 will only be arrested when the two ends 11 are in contact with the ground. If the points of contact are below the horizontal plane through the point of contact of the wheel tire with the ground the further rotation of the rods 5 and the movement of the yoke 15 up toward the lug 18 will enable the ends 11 to attain these points. If one point of contact only is below the said plane and the other above (Fig. 8) the rotation of the rod 5 the end 11 of which comes in contact with the ground above the plane (protuberances, stones, etc.) is arrested the rotation of the other rod 5 continuing with the movement of the yoke 15, by reason of the fact that the resistance to the traction produced by the arrest of the first rod is accommodated by the turning aside of the flexible joint 15.

During the running of the machine if the rods 5 are put so that their ends 11 rub more or less against the ground, the braking action resulting from this friction will be perceived. Similarly owing to the spreading apart of the ends 11 if the rods are lowered into contact with the ground when a turn is made on a slippery road, they will serve to prevent skidding.

For preventing the theft of a machine, it is only necessary to raise the back wheel on the rods 5 and to press a rod or other device having a catch or lock through the wheel, thus joining either the two rods 5 or the forks 7 so as to prevent the apparatus from being operated.

It is evident that modifications of detail may be effected in the construction of details of the devices which constitute this apparatus without departing from the invention.

What I claim and desire to secure by Letters Patent is:—

1. A stand for bicycles and similar vehicles comprising supporting rods each formed with a long supporting arm and short pivoting and operating arms disposed at an angle to the supporting arm, fixed clamps capable of being detachably secured to the frame members of the bicycle or similar vehicle, sleeve bearings on the clamps arranged to embrace the pivoting arms of the supporting rods, a spring on each rod between the sleeve bearing and the operating arm and fixed at one end to the said arm and at the other end to the sleeve for raising the supporting arm of the rod into the inoperative position, a fork pivotally jointed to the end of each short operating arm, and manually operated means connected with the operating arm through the fork for lowering the supporting arm into contact with the ground.

2. A stand for bicycles and similar vehicles comprising supporting rods each formed with a long supporting arm and short pivoting and operating arms, fixing clamps capable of being detachably secured to the frame members of the bicycle or similar vehicle, sleeve bearings on the clamps arranged to embrace the pivoting arms of the supporting rods, a spring on each rod between the sleeve bearing and the operating arm and fixed at one end to the said arm and at the other end to the sleeve for raising the supporting arm of the rod into the inoperative position, a fork pivotally jointed to the end of each short operating arm, a stop arranged to limit the movement of the fork toward the arm, a yoke operatively connected with each fork, and operating means connected with the yoke, the connection between the yoke and forks being adjustable permitting of relative independent movement of the rods for the purpose described.

3. A stand for bicycles and similar vehicles comprising two fixing clamps or sleeves, a bearing sleeve obliquely mounted on each fixing sleeve, two rotary rods passing through the bearing sleeves and the ends of each of which are bent in the same plane so as to form a short traction arm and a long support arm, a fork pivotally jointed to each traction arm, manual operating means connected with the fork, a torsion spring mounted on each rotary rod between the bearing and the short traction arm and serving to bring each pivoting rod into its inoperative position and stops on the fixing clamps to limit the movement of the rods in one direction.

4. A stand for bicycles and similar vehicles comprising detachable mounting means applicable to the rear fork of a bicycle, supporting rods pivoted in said mounting means and each comprising short pivoting and operating arms and a long supporting arm whose range of motion about said pivots enables them to be moved into positions where their lower ends are below the horizontal plane running through the point of contact of the vehicle with the ground, springs adapted to raise the supporting arms into inoperative positions, a fork pivotally jointed to each operating arm, and manually operated means connected with the fork whereby the arms are lowered into the operative position.

In testimony whereof I have affixed my signature, in presence of two witnesses.

PAUL TOURTIER.

Witnesses:
L. FUMANY,
T. BOLOMEY.

Copies of this patent may be obtained for five cents each, by addressing the "Commissioner of Patents, Washington, D. C."